United States Patent
Xiu et al.

(10) Patent No.: US 8,675,078 B1
(45) Date of Patent: Mar. 18, 2014

(54) TEST TECHNIQUE FOR SET-TOP BOXES

(71) Applicant: Thomson Licensing, Issy de Moulineaux (FR)

(72) Inventors: Lincheng Xiu, Carmel, IN (US); Joseph Risley Perrin, Marion, IN (US); Xiaohong Ji, Carmel, IN (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/622,683

(22) Filed: Sep. 19, 2012

Related U.S. Application Data

(60) Provisional application No. 61/541,439, filed on Sep. 30, 2011.

(51) Int. Cl.
*H04N 17/00* (2006.01)
*H04N 17/02* (2006.01)

(52) U.S. Cl.
USPC ........... 348/189; 348/180; 348/181; 348/731; 348/733; 348/732; 348/735; 348/729; 348/737; 348/725; 348/726; 455/73; 455/180.1; 455/181.1; 455/182.1; 455/190.1; 455/191.1; 455/195.1; 455/196.1; 455/226.1; 455/239.1; 455/232.1; 455/339

(58) Field of Classification Search
USPC ......... 348/189, 180, 181, 731, 733, 732, 729, 348/735, 725, 726, 737; 455/73, 180.1, 455/181, 182.1, 190.1, 191.1, 195.1, 196.1, 455/226.1, 239.1, 232.1, 339
See application file for complete search history.

(56) References Cited

U.S. PATENT DOCUMENTS

| | | | | |
|---|---|---|---|---|
| 7,262,815 B2 * | 8/2007 | Su | ................................ | 348/731 |
| 7,349,034 B2 * | 3/2008 | Yamamoto | ..................... | 348/731 |
| 7,620,382 B2 * | 11/2009 | Yamamoto | ................. | 455/343.1 |
| 7,756,500 B1 * | 7/2010 | Fulga et al. | .................... | 455/266 |
| 8,489,052 B2 * | 7/2013 | Bult et al. | .................. | 455/252.1 |
| 2002/0047942 A1 * | 4/2002 | Vorenkamp et al. | .......... | 348/731 |
| 2003/0022646 A1 * | 1/2003 | Bult et al. | .................. | 455/232.1 |
| 2006/0221256 A1 * | 10/2006 | Birleson et al. | ................ | 348/725 |
| 2007/0105504 A1 * | 5/2007 | Vorenkamp et al. | ............ | 455/73 |
| 2009/0066847 A1 * | 3/2009 | Birleson et al. | ................ | 348/725 |
| 2009/0109347 A1 * | 4/2009 | Lester et al. | ..................... | 348/731 |
| 2009/0290793 A1 * | 11/2009 | Engholm et al. | .............. | 382/171 |
| 2010/0149430 A1 * | 6/2010 | Fulga et al. | .................... | 348/731 |
| 2010/0149431 A1 * | 6/2010 | Fulga et al. | .................... | 348/731 |

(Continued)

FOREIGN PATENT DOCUMENTS

| | | |
|---|---|---|
| JP | 10153636 | 6/1998 |
| JP | 2007064852 | 3/2007 |

(Continued)

*Primary Examiner* — Jefferey Harold
*Assistant Examiner* — Mustafizur Rahman
(74) *Attorney, Agent, or Firm* — Robert D. Shedd; Robert B. Levy

(57) ABSTRACT

A test system (200) for testing for missing or shorted parts within a tuner circuit includes a signal generator (202) for applying a harmonic-containing baseband time varying RF test signal to the tuner circuit. The tuner circuit is tuned to a harmonic of test signal. A detector 208 coupled to the baseband IF output of the tuner circuit detects the voltage generated in response to the applied RF test signal. A voltage measurement device (210) measures voltage detected by detector to provide an indication of the gain. Significant changes in the gain indicate missing part(s) or short circuits.

15 Claims, 8 Drawing Sheets

(56) References Cited

U.S. PATENT DOCUMENTS

2010/0231398 A1* 9/2010 Engholm et al. .............. 340/658
2011/0134334 A1* 6/2011 Stevenson .................... 348/731
2011/0134335 A1* 6/2011 Laurent-Michel et al. ... 348/731

FOREIGN PATENT DOCUMENTS

| | | |
|---|---|---|
| JP | 2007157781 | 6/2007 |
| KR | 2009057518 | 6/2009 |
| KR | 101153517 | 6/2012 |

* cited by examiner

TEST TECHNIQUE FOR SET-TOP BOXES

CROSS-REFERENCE TO RELATED APPLICATIONS

This application claims priority under 35 U.S.C. 119(e) to U.S. Provisional Patent Application Ser. No. 61/451,439, filed Sep. 30, 2011, the teachings of which are incorporated herein.

TECHNICAL FIELD

This invention relates to a technique for testing set-top boxes and the like.

BACKGROUND ART

Current day set-top boxes typically include one of more tuners for tuning RF signals for extracting signals transmitted by a satellite or cable television service provider. A typical set top box tuner will include various components, including various integrated circuits, as well as passive components, (e.g., resistors, inductors, and capacitors) mounted on a circuit board inside an enclosure. Due to the limitation of board space and the nature of the RF signal received by the set-top box tuner, detection of missing parts and short circuits ("shorts") has proved a challenge because of the difficulty in adding one or Integrated Circuit Test points on the circuit board for this purpose. Thus, other mechanisms become necessary to detect missing parts or shorts in the tuner circuit during product assembly.

In the past, set-top box manufacturers have relied on the Media over Cable Association (MOCA) transmission (TX) signal for detecting missing part(s) or shorts in the tuner circuit during product assembly. However, if the set-top box does not have a MOCA transmitter, another test technique becomes necessary. Moreover, the MOCA transmission signal frequency has a limited frequency range (475-625 MHz), whereas the parts in a set-top box tuner typically operate in a frequency range of 950-2150 MHz. Thus, the coverage range of the MOCA frequency for checking for shorted or missing parts is limited.

Thus, a need exists for a technique for testing a set-top box capable of checking the working frequency range of components within the box.

BRIEF SUMMARY OF THE INVENTION

A method for testing for missing or shorted parts within a tuner circuit commences by applying a harmonic-containing baseband time varying RF test signal to the tuner circuit. The tuner circuit is tuned to a harmonic of test signal. Thereafter, a baseband IF output of the tuner circuit measured to detect gain. If any part is missing or shorted, the gain will exhibit significant change.

DETAILED DESCRIPTION

Figure 1:
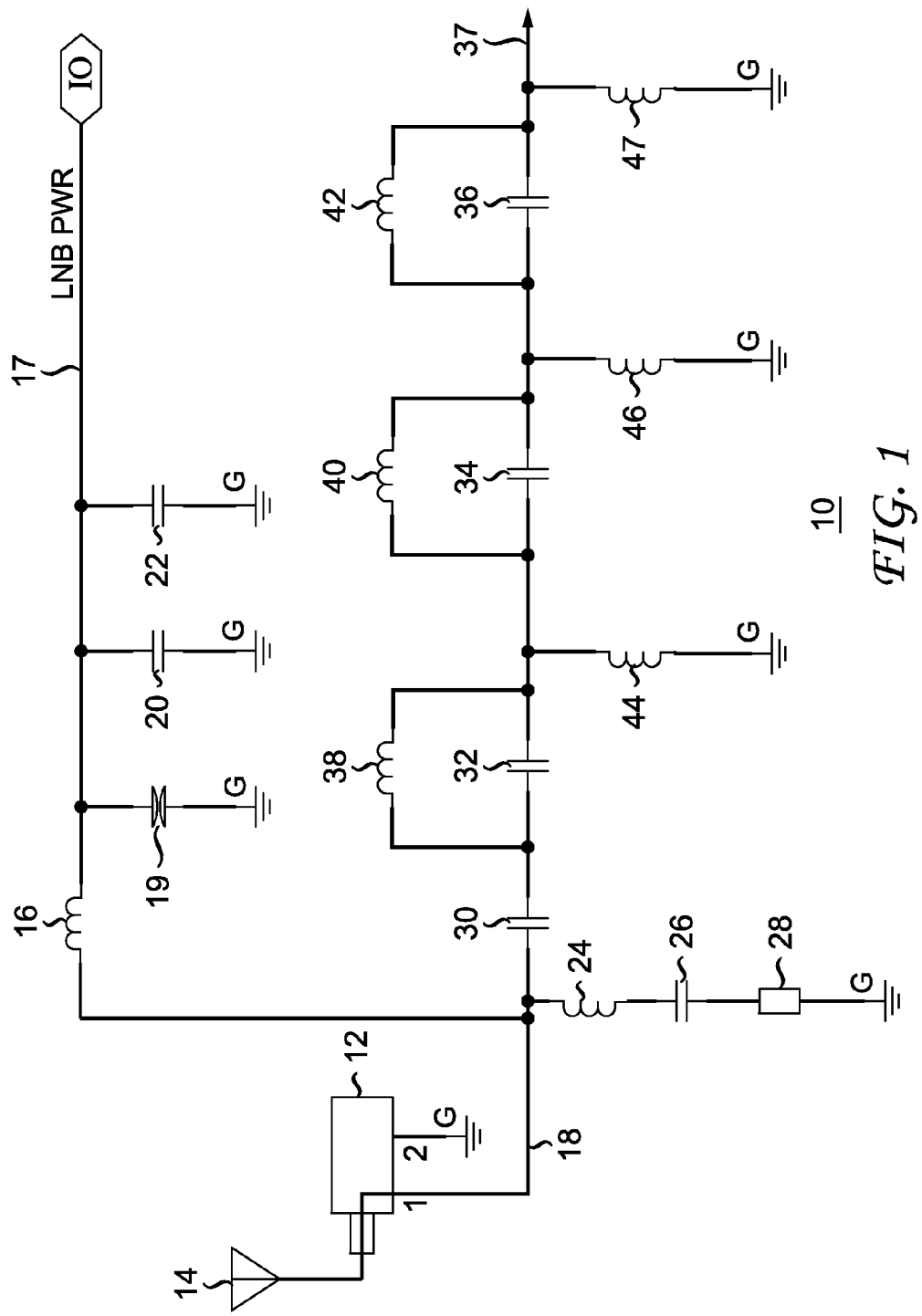
FIG. 1 depicts an exemplary schematic diagram of a tuner circuit of a typical set-top box.

FIG. 1 depicts an exemplary high-pass filter circuit 10 of the type commonly found in satellite set-top boxes. The circuit 10 includes an antenna jack 12 coupled to an antenna 14. An inductor 16 passes a DC voltage from a DC supply (not shown) on a line 17 coupled to a line 18 from the antenna jack. A gas discharge tube 19 and capacitors 20 and 22 each shunt the line 18 to ground. The series combination of an inductor 24, a capacitor 26, and a resistor 28 shunt the line 18 to ground. A series combination of capacitors 24, 32, 34, and 36 coupled the line 18 to an output 37 of the circuit 10. A separate one of inductors 38, 40 and 42 shunts a respective one of capacitors 32, 34 and 36, respectively. An inductor 44 shunts the junction between capacitors 32 and 34 to ground whereas the inductor 46 shunts the junction between capacitors 34 and 36 to ground. An inductor 47 shunts the output 37 of the tuner circuit 10 to ground.

In practice, the components of the circuit 10 described above reside on a circuit board (not shown). Due to constraints on the size of the circuit board, placement of test pads becomes very difficult so use of a functional test technique becomes necessary to detect missing tuner components during manufacture. If the part is missing in circuit 10, the gain will typically show a significant change. Therefore, measurement of the gain of the circuit 10 during production can provide a mechanism for detecting one or more missing parts. A commercial Vector Network Analyzer (VNA) can easily measure the gain. However, such devices have a high cost, effectively prohibiting their use.

Figure 2:
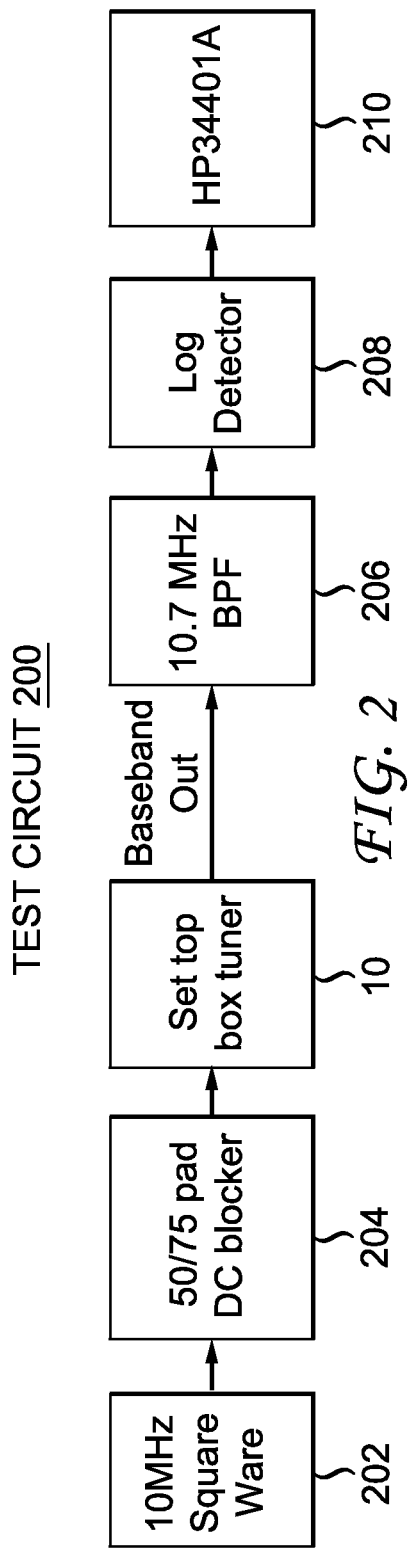
FIG. 2 depicts a test apparatus for testing the tuner circuit of FIG. 1.

In accordance with the present principles, gain measurement can occur using a low-cost test system 200 depicted in block schematic form in FIG. 2. As discussed in detail below, the test system 200 includes a signal generator 202 for applying a time-varying RF signal test signal, for example, a square wave rich in harmonics so that the periodic spectrum of the test signal drives the test circuit 10 of FIG. 1. The circuit 10 can tune to one of the harmonics of the test signal. Measuring the baseband output of the circuit 10 using a log detector enables calculation of the gain.

In practice, the signal generator 202 of the system 200 provides a 10 MHz square-wave signal to the antenna input of the circuit 10 of FIG. 1 through an impedance match and DC-blocker 204. The test system 200 also includes a band pass filter 206 for band-pass filtering the output of the circuit 10 for receipt by a log detector 208, typically, although not necessarily, an Analog Devices model AD8306 High Precision Limiting-Logarithmic Amplifier. A voltage-measuring device 210, such as, but not limited to, a Hewlett Packard Model 34401A multi-meter, serves to determine the voltage produced at the output of the log detector 208. Thus, the voltage-measuring device 210 provides a measure of the gain of the circuit 10 in response to the time-varying harmonic-rich signal received at the input of the circuit 10 from the signal generator 202.

As previously discussed, the conventional approach to testing the circuit 10 of FIG. 1 would make use of a Vector Network Analyzer (not shown) having a tracking signal generator that would sweep the frequency of the signal applied to the input circuit 10. The test system 200 of FIG. 2 does not need require the use of such a tracking generator since the harmonic-rich square wave output signal of the signal generator 202 has proven successful in practice to sweep the input of the circuit 10 during testing.

Figure 3:
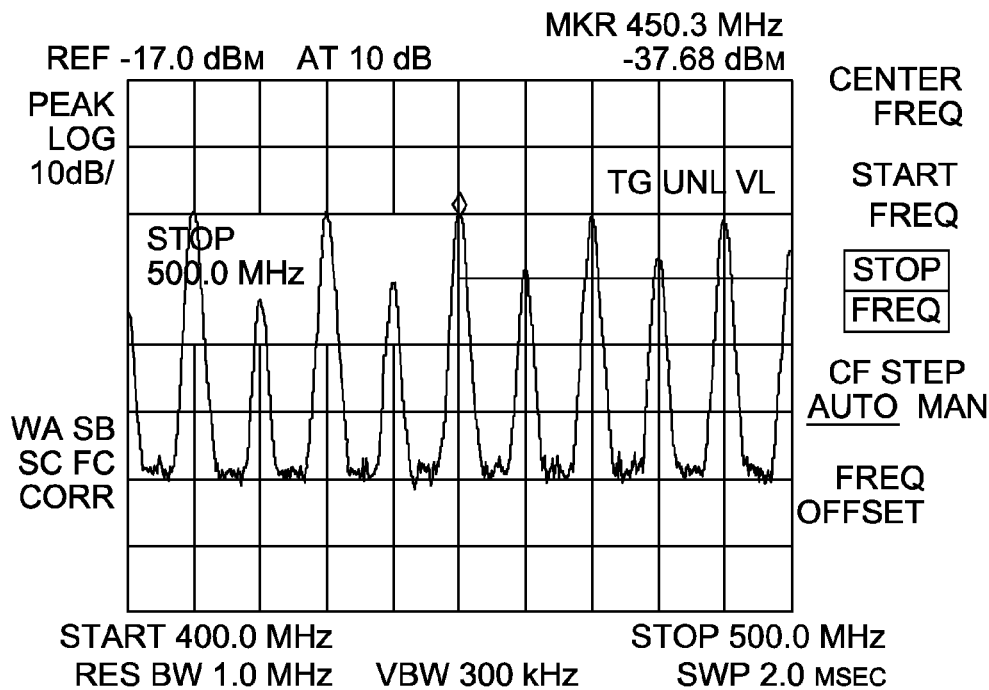
FIG. 3 depicts an exemplary spectrum of a 10 MHz square wave test signal from the test apparatus of FIG. 2 for the frequency spectrum of 400 MHz to 500 MHz.

FIG. 3 and Table 1 show the spectrum of a square wave, 10 MHz, 0.517Vpp (with 50 ohm load) produced by the signal generator 202 of FIG. 2.

TABLE 1

| MHz | dBm | Note |
| --- | --- | --- |
| 10 | 0 | Fundamental |
| 110 | −20.6 | |
| 410 | −32.7 | |
| 610 | −36.1 | |
| 950 | −53 | |
| 1510 | −70 | Sinc function zeros |
| 2010 | −65 | |
| 2190 | −67 | Tuner can reach −70 dBm |

Figure 4:
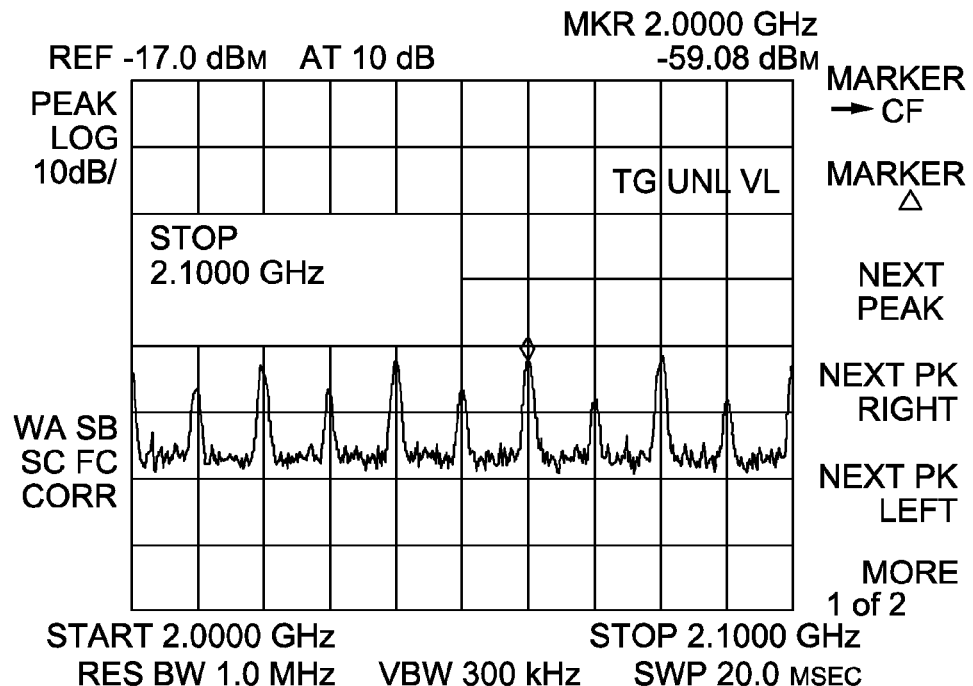
FIG. 4 depicts an exemplary spectrum of a 10 MHz square wave test signal from the test apparatus of FIG. 2 for the frequency spectrum of 2.0 GHz to 2.1 GHz.
Figure 5:
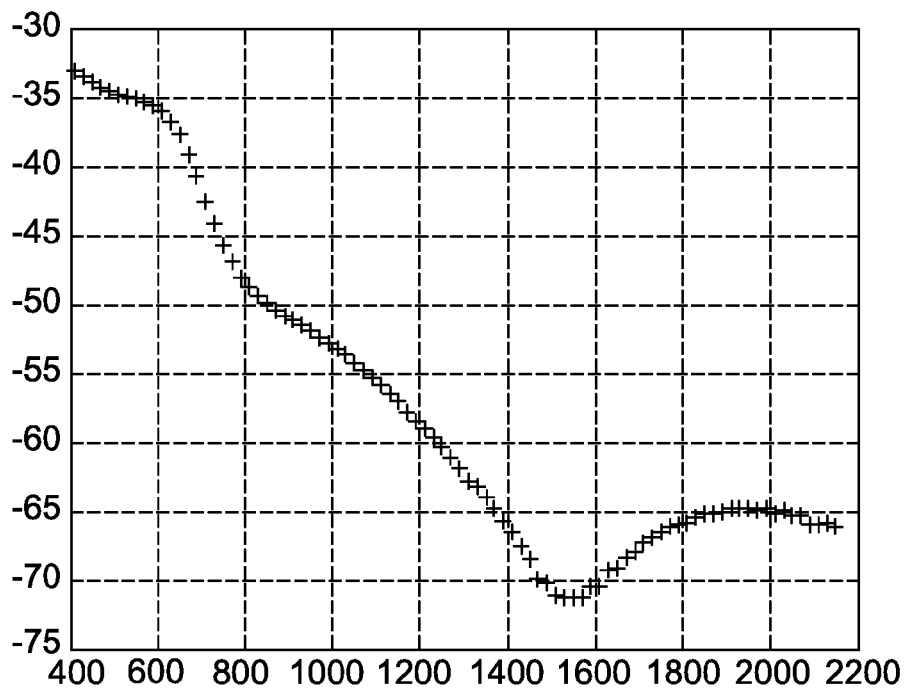
FIG. 5 depicts an exemplary spectrum of a 10 MHz square wave test signal from the test apparatus of FIG. 2 for the frequency spectrum of 400 MHz to 2.2 GHz.

For testing purposes, the MOCA band and L band, which cover 400 MHz to 2.15 GHz as shown in Table 1, are of interest. FIG. 3 shows the frequency spectrum of the harmonics for the 10 MHz square wave signal produced by the signal generator 202 of FIG. 2 in the 400-500 MHz range. FIG. 4 shows the frequency spectrum of the harmonics for the 10 MHz square wave signal produced by the signal generator 202 of FIG. 2 in the 2.0 GHz to 2.1 GHz frequency range. FIG. 5 shows the spectrum of the harmonics of the 10 MHz square wave signal for the 10 MHz square wave signal produced by the signal generator 202 of FIG. 2 in the 400 MHz to 2.2 GHz range.

When testing a circuit 10 used in satellite set-top boxes, for example the circuit 10, using a square wave instead of other waveforms remains preferable because the satellite path typically will have a High Pass Filter, with a 50 dB MOCA band rejecter. Under such circumstances, a stronger input signal in the frequency range of 475 to 625 MHz becomes necessary to test this band.

Figure 6:
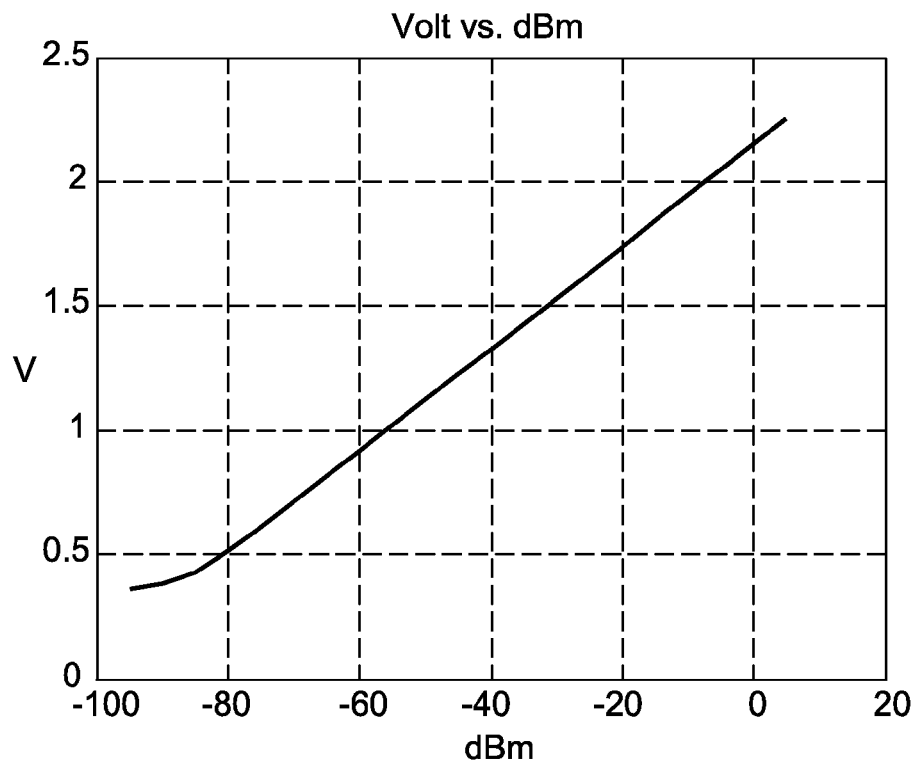
FIG. 6 depicts a graph showing a Voltage versus dBm curve produced by a log detector of the test apparatus of FIG. 2.

A typical tuner in a Set-top Box can tune down to 270 MHz, which covers what the frequency range needed for testing purposes. Most tuners have Automatic Gain Control (AGC), which participates in the gain measurement. For a Broadcom SOC BCM7313 chip used in typical satellite set-top boxes, the AGC range can be measured by the following steps:

1): Set SDS_RCVR_AGICTL and AGTCTL Bit 5 and bit 1
2) Kill the ISR (optional)
3) Write AII and AIT to manually control the IF and RF gain. Using this approach, the tuner AGC ranges are:
IF gain: 0-30 dB when AII changes from 0x0000 0000 to 0xffff fff0
RF gain: 0-26 dB when AIT changes from 0x0000 0000 to 0xffff 0000
gain_dB=IF_dBm−sigLevel_dBm+56−IF_AGC_dB−RF_AGC_dB
RF_AGC_dB(i)=26/65535*(oemRtVal(3)*256+oemRtVal(4));
IF_AGC_dB(i)=30/65535*(oemRtVal(7)*256+oemRtVal(8));

FIG. 6 and Table 2 below lists depicts voltage values measured by the log detector 208 of FIG. 2 for different level output signals of the tuner circuit 10 under test. 2.

TABLE 2

| dBm | V |
| --- | --- |
| 0 | 2.1511 |
| −20 | 1.7331 |
| −40 | 1.3238 |
| −60 | 0.914 |
| −80 | 0.5108 |

Where dBm=48.83409*volt−104.634 for −80<dBm<10.

Table 3 depicts exemplary test results for the circuit 10 undergoing testing via the test system 200 of FIG. 2

TABLE 3

| Tune_freq | RF_freq | RF_dBm | IF_freq | IF_dBm | Gain |
| --- | --- | --- | --- | --- | --- |
| 530.7 | 520 | −41 | 10.7 | −67 | −26 |
| 2020.7 | 2010 | −66 | 10.7 | −45 | 21 |
| 1020.7 | 1010 | −54 | 10.7 | −40 | 14 |
| 860.7 | 850 | −50 | 10.7 | −41.5 | 8.5 |

Figure 7:
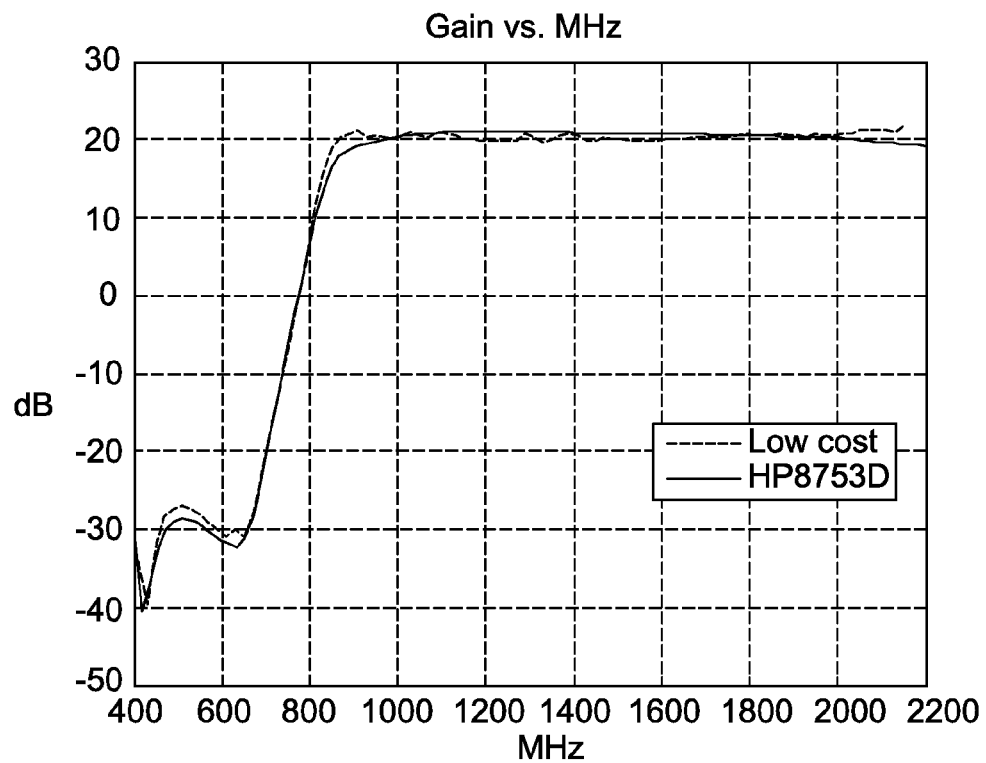
FIG. 7 depicts a graph showing measured gain versus high-pass measured gain produced by the test apparatus of FIG. 2.

FIG. 7 depicts a curve showing an exemplary grain versus measurement made by the test system 200 and a gain versus frequency measurement made by an HP 8753D network analyzer, a vector network analyzer of the type described above. As can be seen from FIG. 7, the gain versus frequency measurement made by the test system 200 of FIG. 2 compares exceptionally well with the gain versus frequency measurement made by the much more expensive vector network analyzer.

Figure 8:
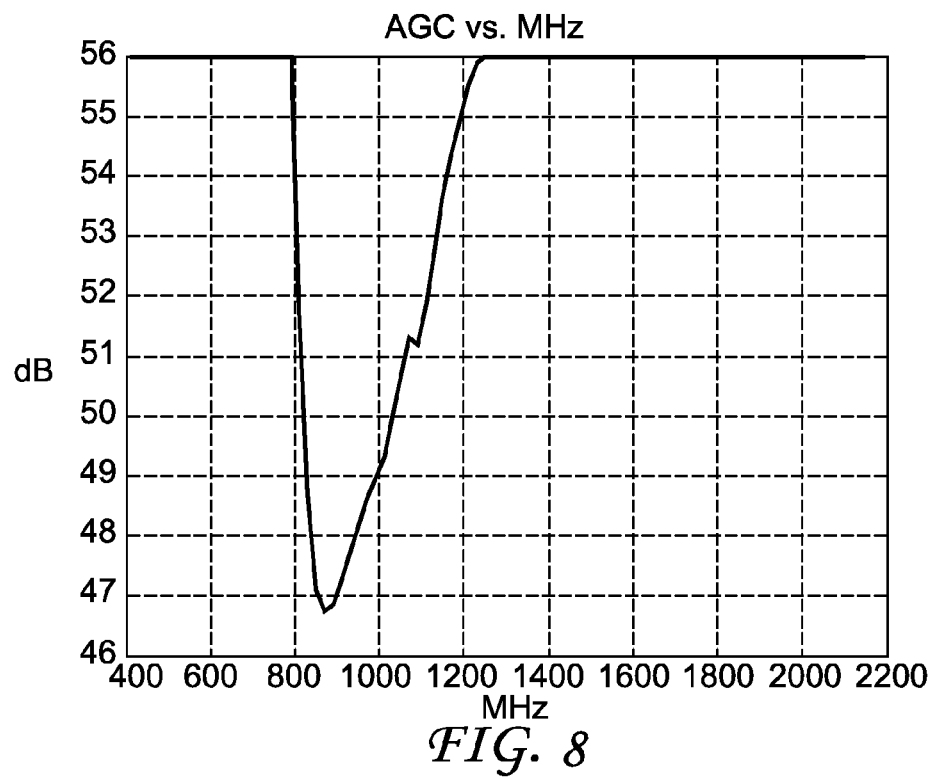
FIG. 8 depicts a graph showing Automatic Gain Control (AGC) during gain measurement by the test apparatus of FIG. 2.
Figure 9:
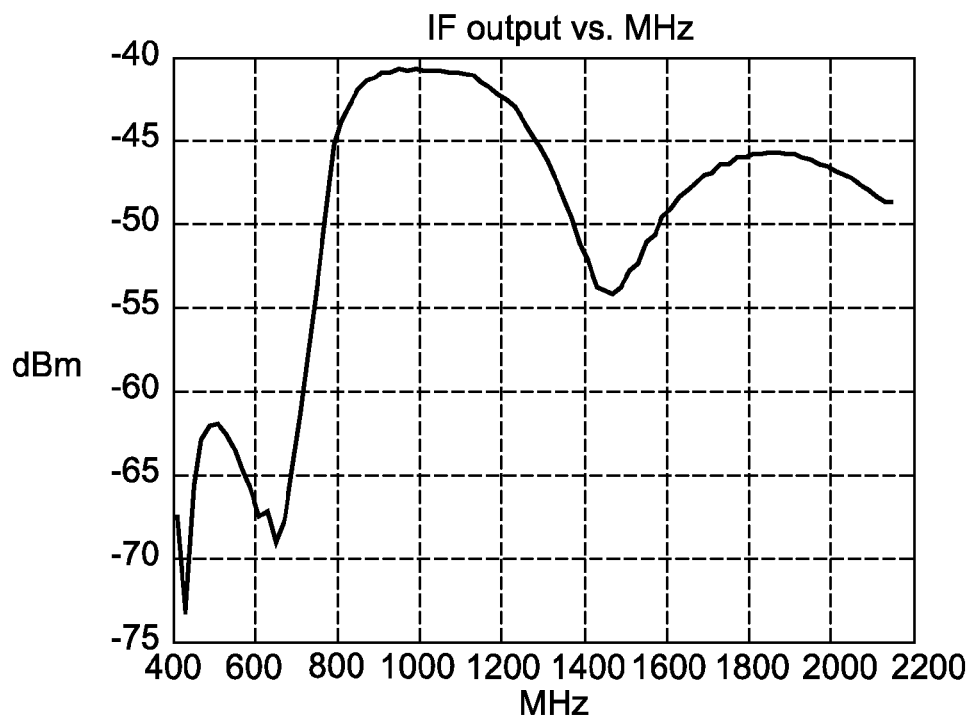
FIG. 9 depicts a graph showing the tuner baseband output measured by the test apparatus of FIG. 2.

FIG. 8 depicts the change in AGC during gain measurement. FIG. 9 depicts a graph of IF output versus frequency, showing peaks at approximately 500 MHz, 1000 MHz, and 1900 Mhz.

Figure 10:
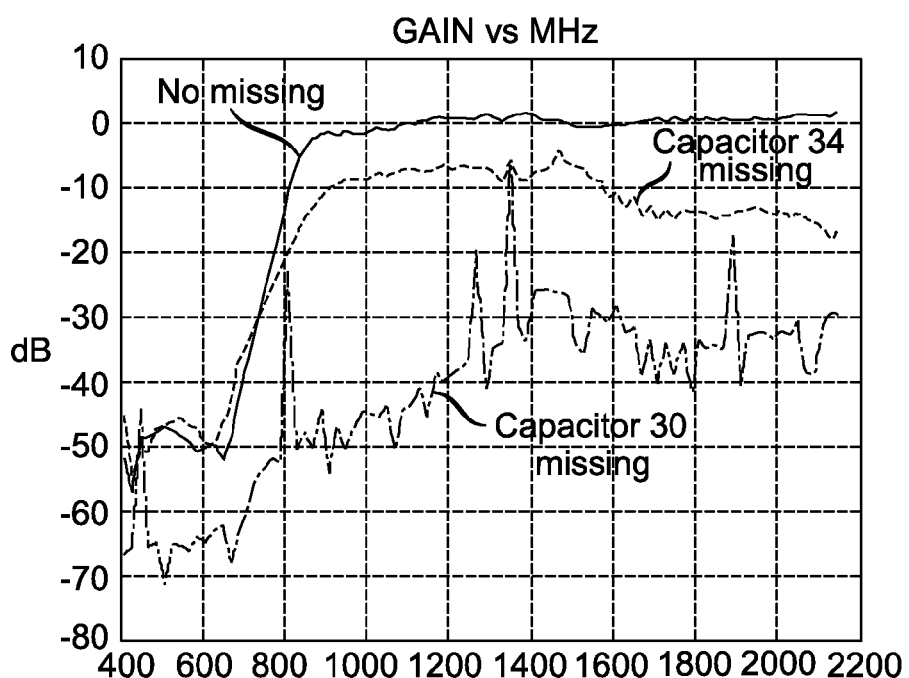
FIG. 10 depicts a set of graphs of gain versus frequency measured by the test apparatus of FIG. 2 when various components are missing from the tuner circuit of FIG. 1
Figure 11:
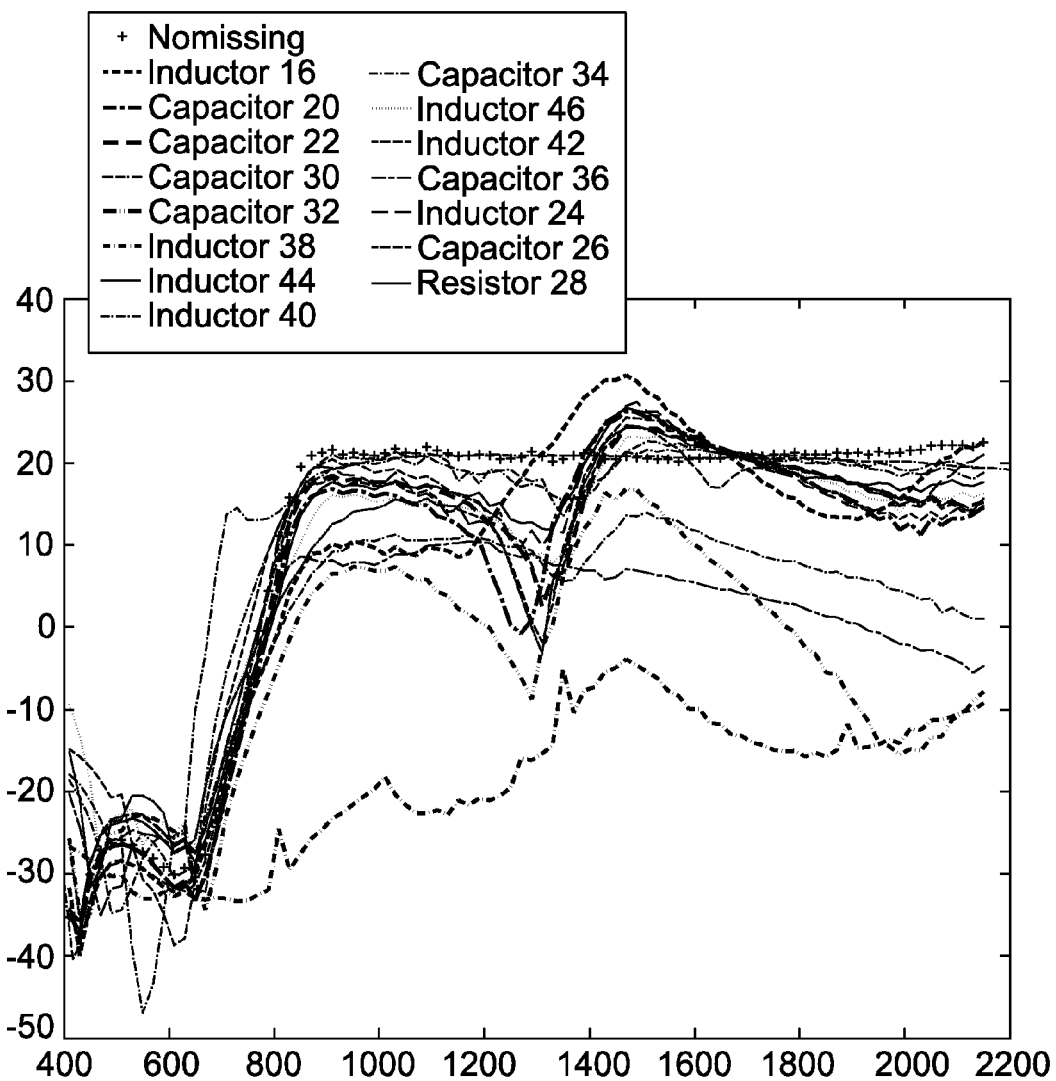
FIG. 11 depicts graphs of gain versus frequency successively measured by the test apparatus of FIG. 2 when individual various components are successively removed from the tuner circuit of FIG. 1.

FIG. 10 depicts a graph of gain versus frequency when no parts are missing and when individual parts are missing such as capacitors 34 or 30. FIG. 11 depicts a set of gain versus frequency curves obtained when of an individual one of the components of the circuit 10 under test was removed.

Figure 12:
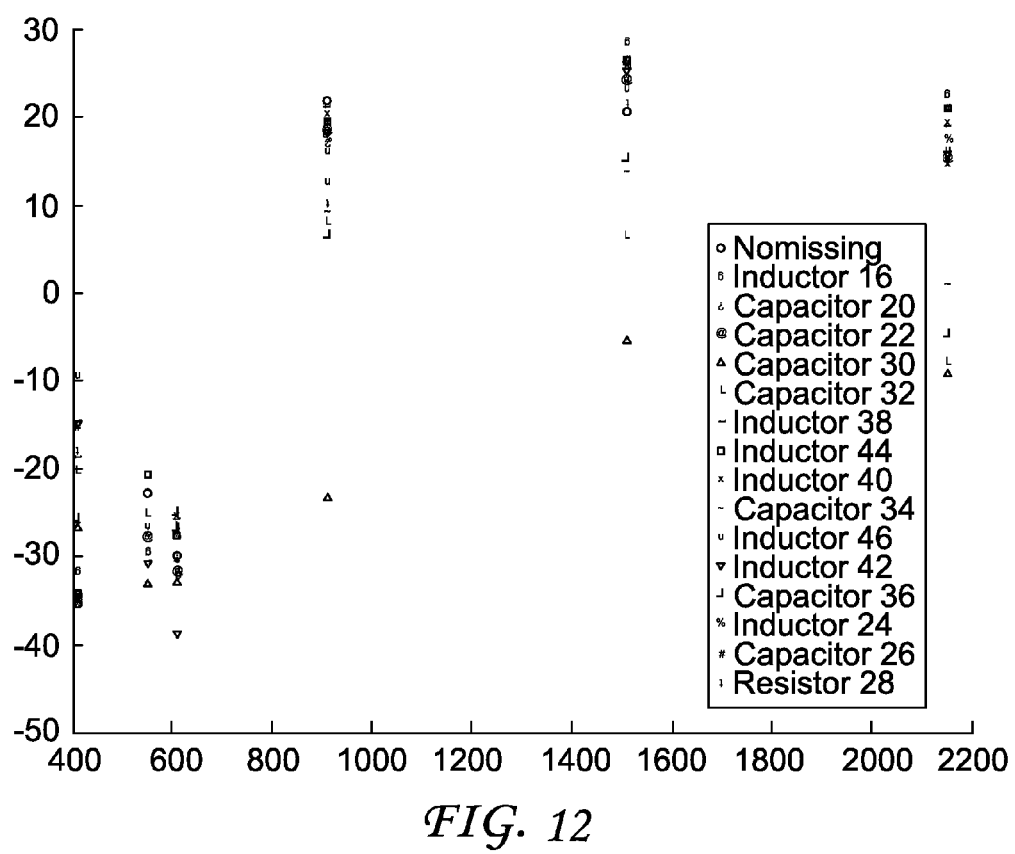
FIG. 12 depicts a graph showing averages of the gain versus frequency when successive components are removed from the tuner circuit of FIG. 1 to establish a unique signature for each part in the tuner circuit of FIG. 1.

FIG. 12 represents an average of a collection gain versus frequency measurements as depicted in FIG. 11. Each component part was removed one at a time and the gain was measured in the manner described using the system 200 to apply a harmonic rich time-varying RF signal to the circuit 10. The process was repeated to collect four graphs. The graphs were then passed through a computer program, such as Matlab, from Mathworks, to read the data from each graph, produce an average of the data, and plots it to a common graph with all other averaged data. The graph of FIG. 12 provided the basis for picking six frequencies for missing part identification. The frequencies chosen were (in MHz) 410, 550, 610, 910, 1510, 2150. Using these points each part should have a unique signature.

Using the aforementioned Matlab computer program, the gain for the six points is processed using the "compare.m" and "compare_direct.m" user defined Matlab scripts. The compare.m function takes the original missing parts data and compares it to the averaged data to see if each part will be identified correctly when compared to the template. The compare_direct.m function of the Matlab program uses the executables "oem.exe" and "mtune.exe" to configure and tune the tuner directly in order to test circuit 10. Only the 6 points of interest are measured to decrease time taken for testing. Once the measurements are made the data is compared to each part template.

The following constitutes the software for performing the following functions:

Comparison of the gain;
Measuring the Square Wave Spectrum;
Measure the log detector gain;
Plot the log detector gain; and
Choose the 6 gain values to compute the average gain

```
+-
% File Name: measure_gain.m
% This program drives HP8594A SA, to measure the curcuit 10 gain curve.
clear all;
load sigLevel_dBm
[stat, str]= system(' gpibwrite 18 SP 0.1MHZ');
[stat, str]= system('gpibwrite 18 CF 10.7MHZ');
[stat, str]= system('gpibwrite 18 RL -35');          % reference level
oemRtVal=zeros(11,1);
freq_MHz_set=410:20:2150; % to measure the square wave harmonic
IF_dBm=zeros(1,1ength(freq_MHz_set));
RF_agc_dB=zeros(1,length(freq_MHz_set));
IF_agc_dB=zeros(1,length(freq_MHz_set));
IF_MHz=10.7;
for i=1:length(freq_MHz_set)
cmd=sprintf('mtune %f', (freq_MHz_set(i)+IF_MHz));
[stat, str]= system(cmd);
pause(0.5)
[stat, str]= system('gpibwrite 18 MKPK');
[stat, str]= system('gpibQuery 18 MKA?');
IF_dBm(i)=(sscanf(str,'%e'));
%now we can read AGC value, keep AGC alive
[stat, str]= system('oem 11 fa e0 d5 01');
oemRtVal=sscanf(str(48:length(str)),'=>DEC: %d %d %d %d %d %d %d %d %d');
RF_AGC_dB(i)=26/65535*(oemRtVal(3)*256+oemRtVal(4));
IF_AGC_dB(i)=30/65535*(oemRtVal(7)*256+oemRtVal(8));
disp ( [freq_MHz_set(i),IF_dBm(i), RF_AGC_dB(i), IF_AGC_dB(i)])
end
gain_dB=IF_dBm-sigLevel_dBm+56-IF_AGC_dB-RF_AGC_dB;
plot(freq_MHz_set,gain_dB)
grid on
hold on
title ('Gain vs. MHz ');
xlabel('MHZ');
ylabel('dB');
figure (2)
AGC_dB=IF_AGC_dB+RF_AGC_dB;
plot(freq_MHz_set,(AGC_dB))
grid on
hold on
title ('AGC vs. MHz ');
xlabel('MHz');
ylabel('dB');
figure (3)
plot(freq_MHz_set,IF_dBm)
grid on
hold on
title ('IF output vs. MHz ');
xlabel('MHz');
ylabel('dBm');
figure(1);
load freq;
plot(freq, S21+15,'r');
legend('Low cost', 'HP8753D');
~~~~~~~~~~~~~~~~~~~~~~~~~~~~~~~~~~~~~~~~~~~~~~
% File name:measurer_squarewave_spectrum.m
% This program drives HP8594A SA, to measure square wave spectrum.
% Manual set SA to RBW=100kHz, Reference level -14 dBm
clear all;
%cmd=sprintf('gpibclear 18'); %reset sA
%[stat, str]= system(cmd);
%freq_MHz_set=410:20:2150; % to measure the square wave harmonic
freq_MHz_set=410:20:990; % to measure the square wave harmonic
%amp_dBm=zeros(1,length(freq_MHz_set));
```

```
sigLevel_dBm=zeros(1,length(freq_MHz_set));
for i=1:length(freq_MHz_set)
cmd=sprintf('gpibwrite 18 CF %dMHZ', freq_MHz_set(i));
[stat, str]=system(cmd);
pause(1)
[stat, str]= system('gpibwrite 18 MKPK');
[stat, str]= system('gpibQuery 18 MKA?');
sigLevel_dBm(i)=(sscanf(str, '%e'))
end
plot(freq_MHz_set,sigLevel_dBm)
grid on
hold on
title ('MHz vs. dBm');
xlabel('MHz');
ylabel('dBm');
% File Name: measure_gain.m
% This program drives HP34401A multi-meter, to measure the circuit 10 gain curve with log
detector.
clear all;
close all;
load
load sigLevel_dBm
%[stat, str]= system('gpibwrite 18 SP 0.1MHZ');
%[stat, str]= system('gpibwrite 18 CF 10.7MHZ');
%[stat, str]= system('gpibwrite 18 RL -35'); % reference level
oemRtVal=zeros(11,1)
freq_MHz_set=410:20:2150; % to measure the square wave harmonic
IF_dBm=zeros(1,length(freq_MHz_set));
RF_agc_dB=zeros(1,length(freq_MHz_set));
IF_agc_dB=zeros(1,length(freq_MHz_set));
IF_MHz=10.7;
k=48.83409; % y=kx+b for log detector.
b=-104.634;
for i=1:length(freq_MHz_set)
cmd=sprintf('mtune %f', (freq_MHz_set(i)+IF_MHz));
[stat, str]= system(cmd);
pause(1)
%[stat, str]= system ('gpibwrite 18 MKPK');
%[stat, str]= system ('gpibQuery 18 MKA?');
%IF_dBm(i)=(sscanf(str, '%e'));
[stat, str]= system('gpibQuery 22 MEAS:VOLT:DC?');
volt=(sscanf(str,'%e'));
IF_dBm(i)=k*volt+b;
%now we can read AGC value, keep AGC alive
[stat, str]= system('oem 11 fa e0 d5 01');
oemRtVal=sscanf(str(48:length(str)),'=>DEC: %d %d %d %d %d %d %d %d %d %d %d');
RF_AGC_dB(i)=26/65535*(oemRtVal(3)*256+oemRtVal(4));
IF_AGC_dB(i)=30/65535*(oemRtVal(7)*256+oemRtVal(8));
disp ( [freq_MHz_set(i),IF_dBm(i), RF_AGC_dB(i), IF_AGC_dB(i)])
end
gain_dB=IF_dBm-sigLevel_dBm+56-IF_AGC_dB-RF_AGC_dB;
plot(freq_MHz_set,gain_dB)
grid on
hold on
title ('Gain vs. MHz ');
xlabel('MHz');
ylabel('dB');
figure (2)
AGC_dB=IF_AGC_dB+RF_AGC_dB;
plot(freq_MHz_set,(AGC_dB))
grid on
hold on
title ('AGC vs. MHz ');
xlabel('MHz');
ylabel('dB');
figure (3)
plot(freq_MHz_set,IF_dBm)
grid on
hold on
title ('IF output vs. MHz ');
xlabel('MHz');
ylabel('dBm');
figure(1);
load freq;
plot(freq, S21+15,'r');
legend('Low cost','HP8753D');
%this program will take existing .fig files, extract the data
%and graph the data to a single plot. As well as an average of
%the plotted data.
%merge_graphs.m
```

```
clc
clear
close all
ext ={'.fig'};
graphs = {'AGCvsMHz';'Gainvs_MHz';'IFvsMHz'};
parts = {'nomissing';'LZ108';'EZ109';'CZ115';'CZ117';'CZ101';...
    'CZ111';'LZ110';'LZ113';'LZ118';'CZ119';...
    'LZ122';'LZ126';'CZ127';'LZ128';'LZ107';...
    'CZ106';'RZ108'};
offsets ={'';'_1';'_2';'_3'};
boards ={'9'; '16'};
color = {'r+';'b+';'g+';'m+';'c+';'y+';'k+';'rx';'bx';'gx';'mx';'cx';'yx';'kx';'r*';'b*';'g*';'m*';'c*';'y*';'k*';};
colcnt = 1;
count = 0;
y = zeros(4,88);
load freq
h = figure(1);
j = figure(2);
k = figure(3);
leg_str ={ };
leg_count = 1;
x1 = [1;8;11;26;56;88;]; %410 550 610 910 1510 2150
x1f= [410;550;610;910;1510;2150;];
for part=1:18,
    for graph=1:3,
        for board=1:2,
            hold on;
            count = 1;
            for offset=1:4,
                file = strcat('.\',boards(board),'\',graphs(graph),'_',parts(part),'_S14MLab21_',boards(board),offsets(offset),ext');
                try
                    d = load(char(file),'-mat');
                    x = d.hgS_070000.children(1).children(1).properties.XData;
                    y(count,:)= d.hgS_070000.children(1).children(1).properties.YData;
                    y1 = d.hgS_070000.children(1).children(1).properties.YData;
                    if(strcmpi(graphs(graph),'IFvsMHz'))
                        if(strcmpi(boards(board);'9'))
                            %fprintf('%s %f,%f,%f,%f,%f,%f\n',char(parts(part))y1(x1(1)),y1(x1(2)),y1(x1(3)),y1(x1(4)),y1(x1(5)),y1(x1(6)));
                            %fprintf('%f;%f;%f;%f;%f;%f;\n',y1(x1(1)),y1(x1(2)),y1(x1(3)),y1(x1(4)),y1(x1(5)),y1(x1(6)));
                            fprintf('"%s";',char(parts(part)));
                        end
                    end
                    figure(h);
                    hold on;
                    plot(x,y(count,:))
                    count = count + 1;
                    hold off;
                catch err
                end
            end
            if (count > 2)
                yavg = y(1,:)./(count-1);
                for i=2:(count-1),
                    yavg = yavg + y(i,:)./(count-1);
                end
                if(strcmpi(graphs(graph),'IFvsMHz'))
                    if(strcmpi(boards(board),'9'))
                        figure(j);
                        blah = char(parts(part));
                        switch blah
                            case {'LZ107', 'CZ106', 'RZ108'}
                                plot(x,yavg,'b:')
                                leg_str(leg_count) = cellstr(blah);
                                leg_count = leg_count + 1;
                            case 'LZ108'
                                plot(x,yavg,'g:')
                                leg_str(leg_count) = cellstr(blah);
                                leg_count = leg_count + 1;
                            case 'CZ115'
                                plot(x,yavg,'r:')
                                leg_str(leg_count) = cellstr(blah);
                                leg_count = leg_count + 1;
                            case 'CZ117'
                                plot(x,yavg,'c:')
                                leg_str(leg_count) = cellstr(blah);
```

```
                    leg_count = leg_count + 1;
                case 'CZ101'
                    plot(x,yavg,'m:')
                    leg_str(leg_count) = cellstr(blah);
                    leg_count = leg_count + 1;
                case 'LZ110'
                    plot(x,yavg,'y:')
                    leg_str(leg_count) = cellstr(blah);
                    leg_count = leg_count + 1;
                case 'CZ111'
                    plot(x,yavg,'g--')
                    leg_str(leg_count) = cellstr(blah);
                    leg_count = leg_count + 1;
                case 'LZ113'
                    plot(x,yavg,'r--')
                    leg_str(leg_count) = cellstr(blah);
                    leg_count = leg_count + 1;
                case 'LZ118'
                    plot(x,yavg,'c--')
                    leg_str(leg_count) = cellstr(blah);
                    leg_count = leg_count + 1;
                case 'CZ119'
                    plot(x,yavg,'m--')
                    leg_str(leg_count) = cellstr(blah);
                    leg_count = leg_count + 1;
                case 'LZ122'
                    plot(x,yavg, 'y--')
                    leg_str(leg_count) = cellstr(blah);
                    leg_count = leg_count + 1;
                case 'LZ126'
                    plot(x,yavg,'g-.')
                    leg_str(leg_count) = cellstr(blah);
                    leg_count = leg_count + 1;
                case 'CZ127'
                    plot(x,yavg,'r-.')
                    leg_str(leg_count) = cellstr(blah);
                    leg_count = leg_count + 1;
                case 'nomissing'
                    plot(x,yavg,'r+')
                    leg_str(leg_count) = cellstr(blah);
                    leg_count = leg_count + 1;
                otherwise
                    %plot(x,yavg,'r')
            end
            figure(k);
            plot(x1f,yavg(x1),char(color(colcnt)));
            colcnt =colcnt + 1;
            %fprintf('static part %s =
{"%s", .95*%f,%f,1.05*%f,.95*%f,%f,1.05*%f,.95*%f,%f,1.05*%f,.95*%f,%f,1.05*%f,.95*%f,%f,1.05*%f,.95*%f,%f,1.05*%f};\n.',blah,blah,yavg(((410-410)/20)+1),yavg(((410-410)/20)+1),yavg(((410-410)/20)+1),yavg(((550-410)/20)+1),yavg(((550-410)/20)+1),yavg(((550-410)/20)+1),yavg(((610-410)/20)+1),yavg(((610-410)/20)+1),yavg(((610-410)/20)+1),yavg(((910-410)/20)+1),yavg(((910-410)/20)+1),yavg(((910-410)/20)+1),yavg(((1510-410)/20)+1),yavg(((1510-410)/20)+1),yavg(((1510-410)/20)+1),yavg(((2150-410)/20)+1),yavg(((2150-410)/20)+1),yavg(((1510-410)/20)+1));
            %fprintf('%s = [%f;%f;%f;%f;%f;%f;]\n',blah,yavg(((410-410)/20)+1),yavg(((550-410)/20)+1),yavg(((610-410)/20)+1),yavg(((910-410)/20)+1),yavg(((1510-410)/20)+1),yavg(((2150-410)/20)+1));
            figure(j);
        end
    end
    figure(h);
    hold on;
    if(strcmpi(graphs(graph),'IFvsMHz'))
        plot(freq,S21+15,'g--');
    end
    plot(x,yavg,'r');
    grid on;
    title(strcat(graphs(graph),'-',parts(part),'-',boards(board)));
file=strcatc('.\merged\',graphs(graph),'_',parts(part),'_S14MLab21_',boards(board),ext');
    hold off;
    saveas(gcf,char(file));
        end
        hold off;
        figure(h);
        close(gcf);
    end
  end
end
```

```
figure(j);
plot(freq,S21+15,'g--');
legend(leg_str);
figure(k);
legend(leg_str);
saveas(gcf,'avg_merged_9.fig');
%this program will use oem.exe and gpibQuery.exe to measure the six
%chosen points for missing part detection and compare the measurements
%to the template data. The top 3 matches will be printed to the screen
%compare_direct.m
close all
clear
nomissing = [-35.296588;-27.324503;-30.089108;21.672383;20.570093;22.533952;];
LZ108 = [-31.698127;-29.392859;-32.140766;10.185280;28.632694;22.499279;];
CZ115 = [-34.779644;-27.417730;-31.670673;16.812950;25.595003;14.643503;];
CZ117 = [-34.739485;-27.717447;-31.692100;18.456583;24.216473;15.267420;];
CZ101 = [-26.671921;-33.013183;-32.804831;-23.318169;-5.458138;-9.203954;];
CZ111 = [-25.715071;-22.899536;-24.944953;6.482144;15.324326;-7.873211;];
LZ110 = [-18.671654;-28.093328;-25.743041;21.074894;22.613928;18.869009;];
LZ113 = [-15.179912;-20.530066;-27.561459;12.592989;24.168545;14.465974;];
LZ118 = [-17.892018;-46.912835;-25.317950;19.381793;21.644654;19.448573;];
CZ119 = [-26.163568;-25.076992;-30.512849;9.264697;13.914735;1.054201;];
LZ122 = [-9.368090;-26.465813;-26.744361;16.089041;23.015365;16.329984;];
LZ126 = [-14.793340;-30.653785;-38.688210;18.091787;25.193597;15.727861;];
CZ127 = [-20.251200;-25.148990;-26.653522;8.188249;6.602823;-4.674796;];
LZ107 = [-35.071958;-23.752973;-27.327082;17.720450;26.162055;17.731054;];
CZ106 = [-34.287086;-22.848966;-26.420487;19.418531;26.292773;21.001741;];
RZ108 = [-34.493836;-23.068358;-26.526343;20.400419;24.099258;14.790296;];
parts =
[nomissing,LZ108,CZ115,CZ117,CZ101,CZ111,LZ110,LZ113,LZ118,CZ119,LZ122,LZ126,
CZ127,LZ107,CZ106,RZ108];
part = {'nomis';'LZ108';'CZ115';'CZ117';'CZ101';...
    'CZ111';'LZ110';'LZ113';'LZ118';'CZ119';...
    'LZ122';'LZ126';'CZ127';'LZ107';...
    'CZ106';'RZ108'};
%board/dmm communication
load sigLevel_dBm
oemRtVal=zeros(11,1);
freq_MHz_set=[410,550,610,910,1510,2150]; % to measure the square wave harmonic
IF_dBm=zeros(1,length(freq_MHz_set));
RF_agc_dB=zeros(1,length(freq_MHz_set));
IF_agc_dB=zeros(1,length(freq_MHz_set));
IF_MHz=10.7;
k=48.83409; % y=kx+b for log detector.
b=-104.634;
for i=1:length(freq_MHz_set)
    cmd=sprintf('mtune %f', (freq_MHz_set(i)+IF_MHz));
    [stat, str]=system(cmd);
    pause(3)
    [stat, str]=system('gpibQuery 22 MEAS:VOLT:DC?');
    volt=(sscanf(str,'%e'));
    IF_dBm(i)=k*volt+b;
    %now we can read AGC value, keep AGC alive
    [stat, str]= system('oem 11 fa e0 d5 01');
    pause(1)
    oemRtVal=sscanf(str(48:length(str)),'=>DEC: %d %d %d %d %d %d %d %d %d %d');
    RF_AGC_dB(i)=26/65535*(oemRtVal(3)*256+oemRtVal(4));
    IF_AGC_dB(i)=30/65535*(oemRtVal(7)*256+oemRtVal(8));
    disp(IF_dBm(i));
end
gain_dB=IF_dBm-sigLevel_dBm(((freq_MHz_set-410)./20)+1)+56-IF_AGC_dB-
RF_AGC_dB-5;
for j = 1:16
    result(j,1) = {sum((transpose(gain_dB) - parts(:,j)).^2)};
    result(j,2) =part(j);
end
missing = sortrows(result,1);
disp(missing(:,:));
```

The invention claimed is:

1. A method for testing for one of a missing or shorted part within a tuner circuit, comprising the steps of:
    applying a harmonic-containing baseband time varying RF test signal to the tuner circuit;
    tuning the tuner circuit to a harmonic of test signal; and
    detecting a change in gain measured at a baseband IF output of the tuner circuit indicative of one of a missing part or short circuit.

2. The method according to claim 1 wherein the time-varying RF test signal comprises a square wave signal.

3. The method according to claim 2 wherein the square wave signal has a frequency of 10 MHz.

4. The method according to claim 1 wherein the comparing step comprises the steps of:
    (a) converting a voltage generated at the baseband IF output to a logarithmic value:
    (b) measuring the logarithmic value to establish the gain.

5. The method according to claim 4 wherein the steps (a) and (b) are repeated multiple times to yield an average gain value.

6. A method for testing for one of a missing or shorted part within a tuner circuit, comprising the steps of:
    applying a harmonic-containing baseband time varying RF test signal to the tuner circuit;
    tuning the tuner circuit to a harmonic of test signal;
    detecting a change in gain measured at a baseband IF output of the tuner circuit, and
    comparing the change in gain to a change in gain associated with a specific missing or shorted part to determine whether that specific part is missing or shorted.

7. The method according to claim 6 wherein the time-varying RF test signal comprises a square wave signal.

8. The method according to claim 7 wherein the square wave signal has a frequency of 10 MHz.

9. The method according to claim 6 wherein the comparing step comprises the steps of:
    (a) converting a voltage generated at the baseband IF output to a logarithmic value:
    (b) measuring the logarithmic value to establish the gain.

10. The method according to claim 9 wherein the steps (a) and (b) are repeated multiple times to yield an average gain value.

11. A test system to detect one of a missing or shorted part within a tuner circuit, comprising:
    a signal generator for applying a harmonic-containing baseband time varying RF test signal to the tuner circuit tuned to receive to a harmonic of test signal; and
    a detector for detecting a voltage at a baseband IF output of the tuner circuit in response to application of the harmonic-containing baseband time varying RF test signal to the tuner circuit; and
    a voltage measurement device for measuring voltage output by the detector to establish gain indicative of a missing component or short circuit.

12. The test system according to claim 1 wherein the signal generator generates a square wave signal.

13. The test system according to claim 12 wherein the square wave signal has a frequency of 10 MHz.

14. The test system according to claim 1 wherein the detector yields a logarithmically varying output voltage.

15. The test system of claim 11 wherein the voltage measurement device comprises a multi-meter.

* * * * *